(12) United States Patent
Zou et al.

(10) Patent No.: US 7,673,148 B2
(45) Date of Patent: Mar. 2, 2010

(54) VERSIONING COMPONENT FOR APPLICATIONS

(75) Inventors: Song Zou, Issaquah, WA (US); Rick Molloy, Redmond, WA (US); Robert Hernon, Bellevue, WA (US); Jared Reisinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 10/966,914

(22) Filed: Oct. 15, 2004

(65) Prior Publication Data

US 2006/0085860 A1    Apr. 20, 2006

(51) Int. Cl.
*G06F 21/00* (2006.01)
*H04L 29/06* (2006.01)
*G06F 17/30* (2006.01)

(52) U.S. Cl. .................. 713/182; 713/163; 713/165; 713/166; 713/167; 713/171; 713/191; 726/1; 726/2; 726/4; 726/7; 726/27; 726/28; 726/30; 726/32; 380/201; 380/202; 380/277

(58) Field of Classification Search .............. 713/182; 380/201
See application file for complete search history.

(56) References Cited

U.S. PATENT DOCUMENTS

| | | | | |
|---|---|---|---|---|
| 6,073,124 A * | 6/2000 | Krishnan et al. | ............... | 705/59 |
| 6,430,608 B1 * | 8/2002 | Shaio | ............... | 709/217 |
| 6,457,076 B1 * | 9/2002 | Cheng et al. | ............... | 710/36 |
| 6,567,793 B1 * | 5/2003 | Hicks et al. | ............... | 705/51 |
| 2002/0069173 A1 * | 6/2002 | Hori | ............... | 705/51 |
| 2002/0083183 A1 * | 6/2002 | Pujare et al. | ............... | 709/231 |
| 2002/0164025 A1 * | 11/2002 | Raiz et al. | ............... | 380/231 |
| 2003/0009538 A1 * | 1/2003 | Shah et al. | ............... | 709/219 |
| 2003/0065947 A1 * | 4/2003 | Song et al. | ............... | 713/201 |
| 2003/0200541 A1 * | 10/2003 | Cheng et al. | ............... | 717/169 |
| 2004/0003390 A1 * | 1/2004 | Canter et al. | ............... | 717/178 |
| 2004/0068721 A1 * | 4/2004 | O'Neill et al. | ............... | 717/168 |
| 2005/0132348 A1 * | 6/2005 | Meulemans et al. | ............... | 717/168 |
| 2005/0132359 A1 * | 6/2005 | McGuire et al. | ............... | 717/175 |
| 2005/0267844 A1 * | 12/2005 | Gallant et al. | ............... | 705/51 |
| 2005/0273779 A1 * | 12/2005 | Cheng et al. | ............... | 717/168 |

* cited by examiner

*Primary Examiner*—Christian LaForgia
*Assistant Examiner*—Jenise E Jackson

(57) ABSTRACT

An application for updating, distributing, and rendering an application feature set and application versions is disclosed. The application component allows multiple versions of similar applications to be installed and upgraded on the same computer. Meanwhile, allowing new product levels downloads to transform an existing product into a different product.

14 Claims, 8 Drawing Sheets

VERSIONING COMPONENT FOR APPLICATIONS

FIELD OF THE INVENTION

Aspects of the present invention relates to updating, distributing, and rendering an application feature set and application versions. More specifically, aspects of the present invention relate to application components that allow multiple versions of similar applications to be installed and upgraded on the same computer.

BACKGROUND OF THE INVENTION

Some software developers distribute their software application to users in a compact disk (CD). Upon installation, users are prompted for a product key number. Depending upon the product key number entered, a different version or level of the software product is installed on the user's machine. If in the future the user wishes to change product levels, the product must be uninstalled and the appropriate product level or version re-installed. This process unnecessarily consumes time.

Furthermore, once the software application is installed, additional features can not be easily added or removed. Installing new features typically requires downloading entire, new files to replace or supplement existing files. Downloading entire files unnecessarily consumes both time and bandwidth.

Therefore, there is a need in the art for an application that allows users to more quickly download feature set updates. There is also a need in the art for an application component that allows multiple, different versions or levels of the same software product to be installed on the same computer without requiring a separate installation of application files for each version or level.

BRIEF SUMMARY OF THE INVENTION

Aspects of the present invention address one or more of the issues mentioned above, thereby allowing multiple installations of applications within the same product family to coexist on a computer. Various aspects of the invention allow an application to control the feature set displayed to the user by using a user's subscription level, user installation table, and/or application initialization context. Various aspects of the invention permit binary patch files to be downloaded and applied to application files on the user's machine. Thus, permitting an application to be converted from one product to another product, or converting the application from one product level to another product level. Aspects of the invention include various remote computing device for authenticating a user of the application, providing manifest information, and providing binary patch files. The invention may be implemented in a computer-readable medium containing computer-executable instructions for updating, distributing, and rendering an application feature set for application versions and levels.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
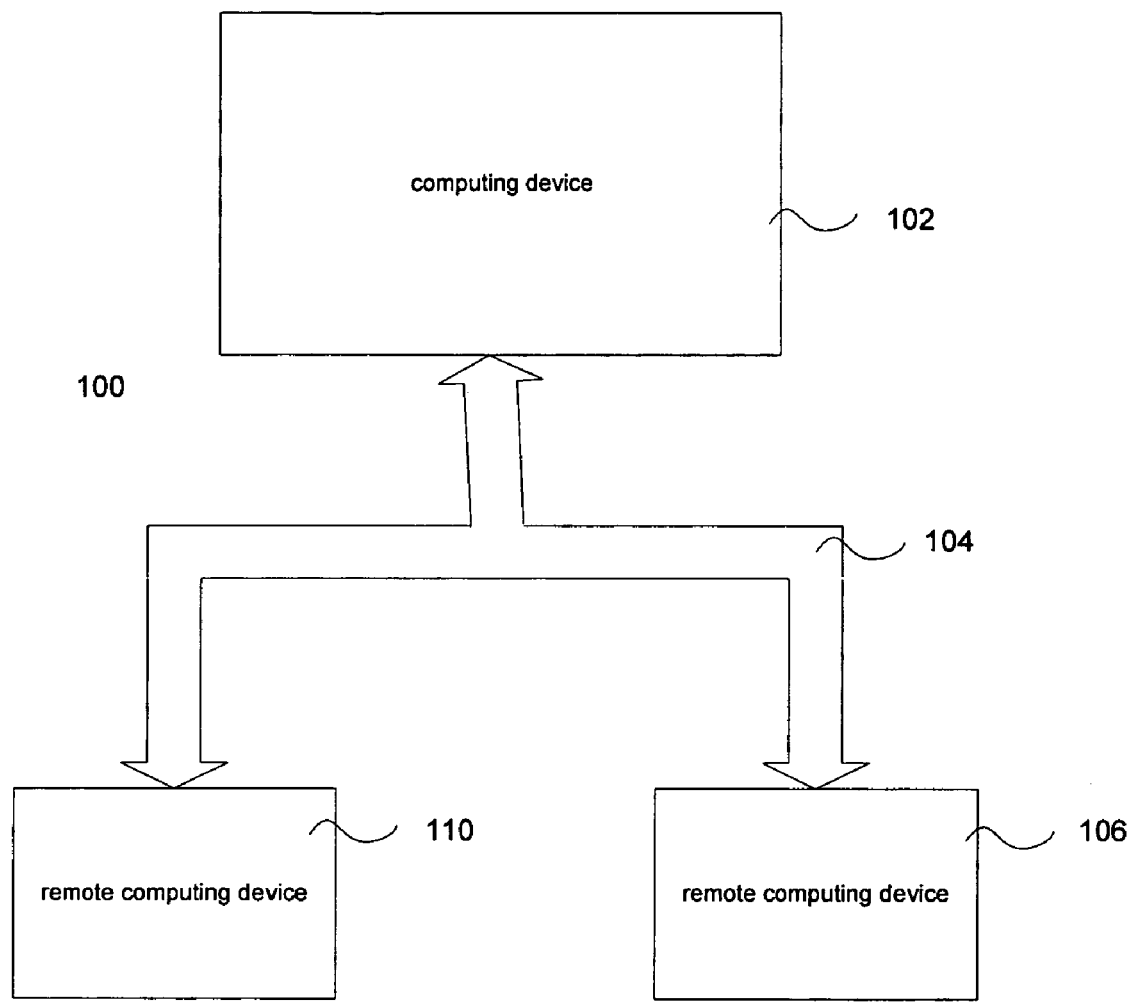
FIG. 1 shows an illustrative distributed computing system operating environment that may be used to implement aspects of the invention.

FIG. 1 illustrates an example of a suitable operating environment 100 in which aspects of the invention may be implemented. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Aspects of the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Suitable operating environment 100 may include at least some form of computer readable media. Computer readable media can be any available media that can be accessed by computers or other devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computers or other devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

A computing device 102 may operate in a networked environment using logical connections to one or more remote computing devices 106, 110. The remote computing devices 106, 110 may be personal computers, servers, routers, network PCs, peer devices or other common network nodes. The logical connections 104 depicted in FIG. 1 include a local area network (LAN) and a wide area network (WAN), but may also include other networks. Such networking environments are commonplace in offices, enterprise-wide computer networks, intranets, and the Internet. Aspects of FIG. 1 will be discussed throughout the discussion below.

Figure 2:
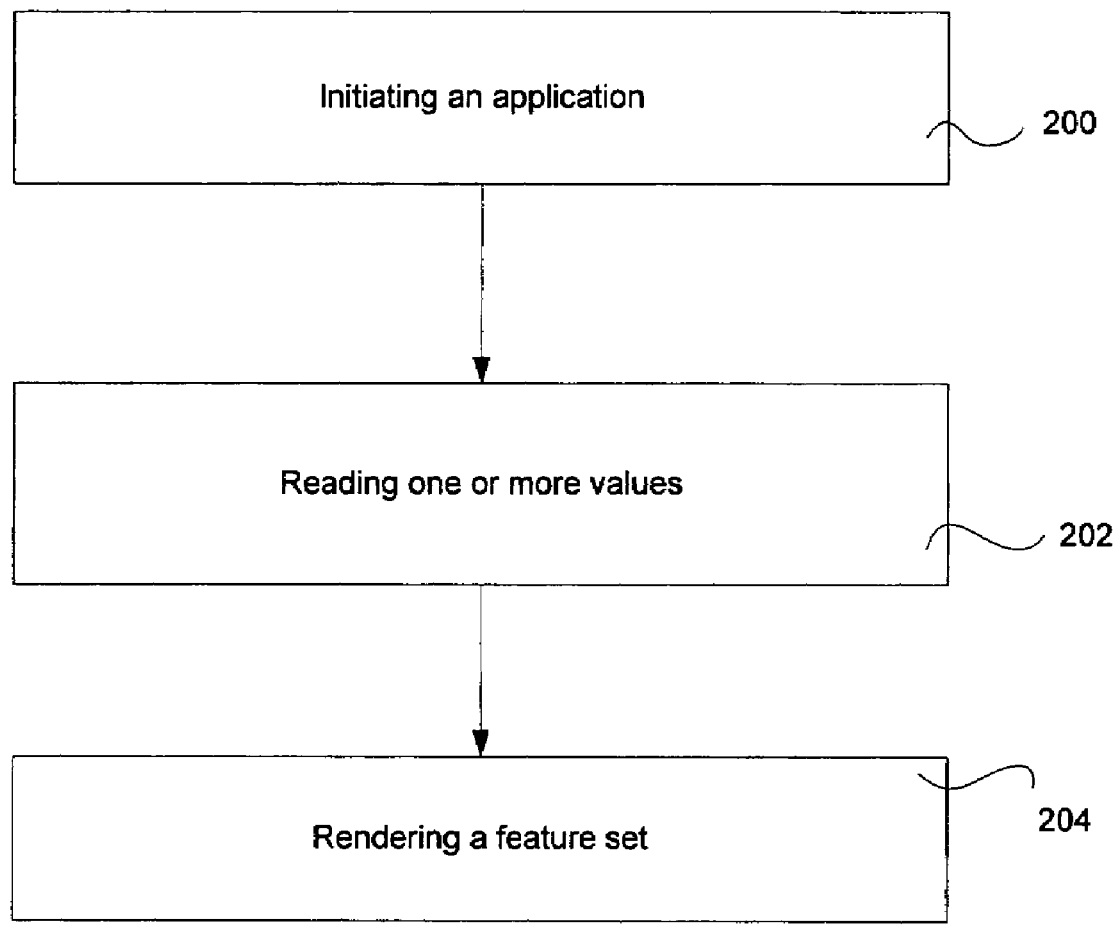
FIG. 2 illustrates a method of restricting user access to a product feature set or product level in accordance with various embodiments of the invention.

FIG. 2 illustrates a method of restricting access to a product feature or product level on a computing device 102 in accordance with various embodiments of the invention. First, an application on computing device 102 may be initiated in step 200 by a user or automatically initiated by software. Next, a value in the computing device 102 may be read in step 202 to determine which feature set to render to the user. This value may represent a user's subscription level, application initialization context, and/or feature set installed on the computing device 102. According to this value, a feature set may be rendered or restricted in step 204 from the user.

In accordance with various embodiments of the invention, the subscription level for the user may be a value that indicates the greatest product level and/or feature set accessible to the user. For example, if the user purchased MICROSOFT® MONEY standard edition, the subscription level for the user might be '1'. If the user purchased MICROSOFT® MONEY deluxe edition, the subscription level for the user might be '2'. The product level may relate to the standard and deluxe editions of the product. In various embodiments there may be a one-to-one relationship between feature set and product level. For example, a product level value of '1' may correspond to features A, B, and C, while a product level value of '2' may correspond to features A, B, C, and D. Meanwhile, in various embodiments of the invention, product level may relate to product releases or versions. In another example, if the user purchased MICROSOFT® WORD, the subscription level for the user might be '2'. If the user only purchased MICROSOFT NOTEPAD™, however, then the user's subscription level might be '1'. One of skill in the art will appreciate that the value of the subscription level for the user need not be limited to a numerical or integer value. In various embodiments the subscription level for the user may be stored in an encrypted form in the registry of a computing device 102.

Moreover, one skilled in the art will appreciate that product levels or subscription levels may be organized in various ways. For example, levels may be organized hierarchically, where all higher levels are supersets of lower levels. For example, a subscription level of '1' may be assigned features A, B, and C. Meanwhile, a greater subscription level of '2' may then correspond to all the features in subscription level '1' plus additional features D, E, and M. In another example, the feature set assigned to a particular subscription level may be changed. For example, feature A may be removed from subscription level '1,' or feature N may be added to subscription level '1.' In addition, feature A may be replaced with feature N in a given subscription level. One of ordinary skill in the art will realize that the invention is not limited in the way subscription levels and features are organized or structured.

In accordance with various embodiments of the invention, the application initialization context may be used to indicate from where the user initialized the application. For example, if the MICROSOFT® MONEY application was invoked from the start menu, then the value of the application initialization context might be different from what it would have been if the application was invoked from a web browser. Likewise, the value of the application initialization context may also be different if the application was invoked from an icon for the standard edition of MICROSOFT® MONEY, rather than from an icon for the deluxe edition of MICROSOFT® MONEY. At least one advantage of aspects of the invention is that it allows multiple product level or versions of similar applications to co-exist on a single computing device, such as computing device 102.

In accordance with various embodiments of the invention, a representation of the feature set installed on a computing device 102 may be maintained in a user installation table. In various embodiments the user installation table may be stored in the registry of the computing device 102 and may be encrypted. The encryption key may be randomly generated and unique to an installation or device. This unique key may be stored in computing device 102 and used to validate the integrity of installation table. The user installation table may be comprised of the installed product level and feature set available on the computing device 102. One skilled in the art will appreciate that once identified and, if appropriate, decrypted, the value stored in the registry might reveal the various product levels and feature sets available on the computing device 102. Furthermore, one skilled in the art will recognize the various forms of encryption, such as public-key encryption, that may be implemented with various embodiments of the invention. In various embodiments, the user may not have access rights to each feature and product level listed in the user installation table. For example, a particular feature set of a product may be disabled for a user in a particular country or locale. In another example, a particular feature set may be customized for a given user, group of users, or product level. The feature set may be represented by a series of binary values (i.e., 0 or 1) to represent a feature being active or disabled.

Figure 3:
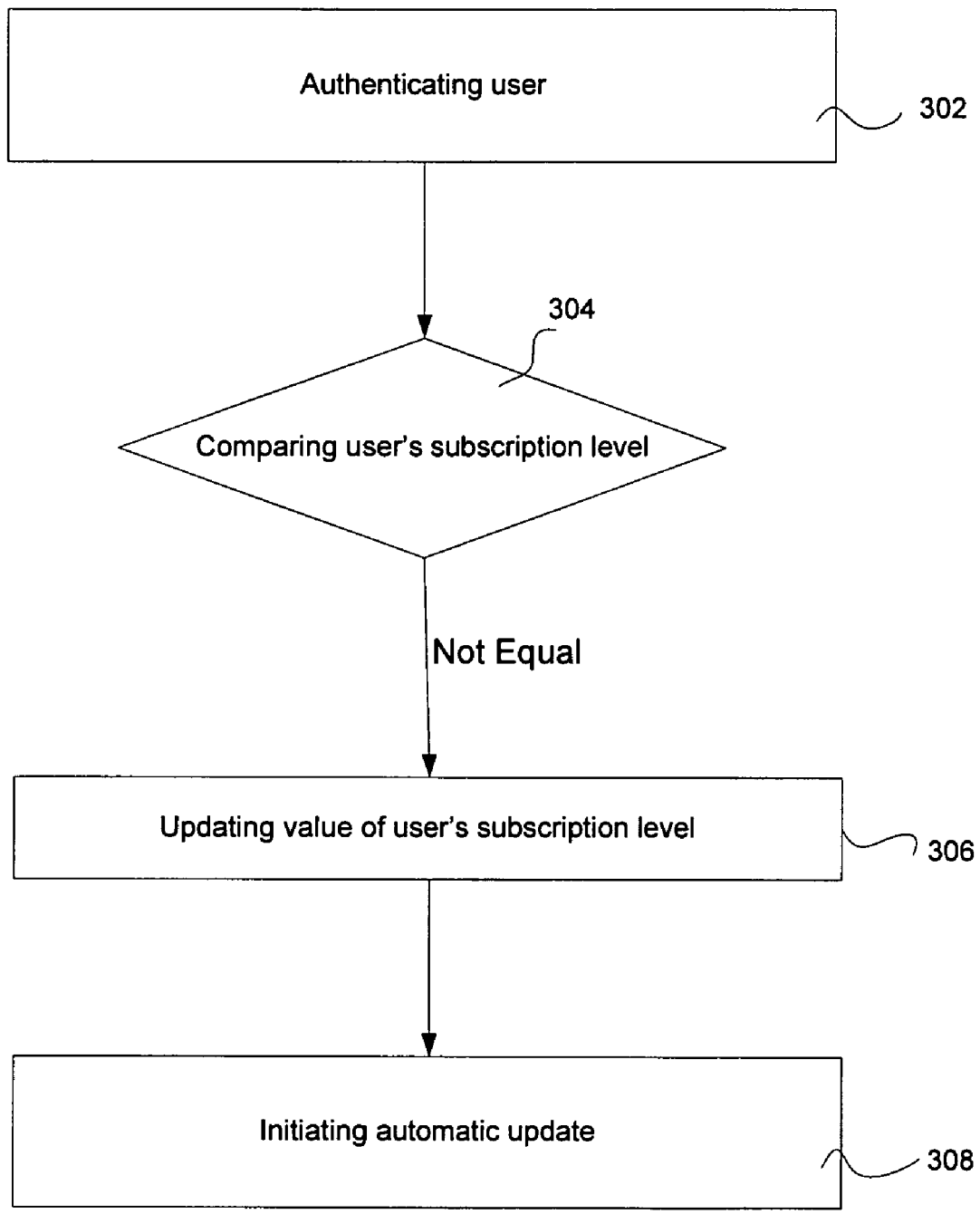
FIG. 3 illustrates a method for updating the subscription level for a user in accordance with various embodiments of the invention.

FIG. 3 illustrates a method for updating a user's subscription level on a computing device 102 in accordance with various embodiments of the invention. After initiating an application in step 200, a user may be authenticated in step 302 with a remote computing device 110. In step 302, the user may be authenticated manually or automatically. The remote computing device 110 may be a MICROSOFT® passport server, or any other authentication device known to those skilled in the art. One skilled in the art will appreciate that step 302 of authenticating the user with a remote computing device 110 can occur anytime prior to, during, or after initiating an application in step 200. In addition, one skilled in the art will appreciate that step 302 of authenticating the user with a remote computing device 110 may include, in various embodiments, the step of independently downloading information from remote computing device 110 at an earlier time, and subsequently using that information to assist in authenticating the user.

Next in step 304, the value of the user's subscription level, which might be stored on a remote computing device 110, may be compared to the value of the subscription level for the user stored on the computing device 102. If the values match, the subscription level for the user has not changed. If the values do not match, then a subscription level for the user stored on the computing device 102 may be updated in step 306 with a value stored on the remote computing device 110. For example, if the user of the standard edition of MICROSOFT® MONEY recently made a purchase of the deluxe edition of MICROSOFT® MONEY, the value of the user's subscription level stored on the remote computing device 110 might be changed from '1' to '2'. Assuming the user has not authenticated with a remote computing device 110 since the purchase, the value of the user's subscription level on the computing device 102 might still be '1'. After step 302, the value of the user's subscription level stored on the computing device 102 may be updated to '2'. Among the various advantages of this method, this method prevents a potential security breach because the value of the user's subscription level on a computing device 102 will be reverted to the actual value stored on the remote computing device 110. Thus, preventing the user from accessing a restricted feature set of a product.

In another example, the user's subscription level may not be stored on the computing device 102. Rather, the user's subscription level may be stored on a remote computing device 110. Then, the user's subscription level might be used to regulate modifications to the user installation table on the computing device 102. The user may be prevented from inserting an entry in the user installation table that corresponds to a product level greater than the user's subscription level. For example, if a user's subscription level was '1', then the user may not be allowed to access an installation of MICROSOFT® MONEY deluxe edition because the product level for MICROSOFT® MONEY deluxe edition may correspond to '2'. Also for example, if a user's subscription level was '2' and the computing device 102 had an installation level of '1,' then in various embodiments, the installation level on the computing device 102 might be upgraded with additional features.

Furthermore, notice that in various embodiments, the files for the deluxe edition of a product may already exist on the computing device 102, but the user may still be prohibited from accessing these features. One skilled in the art will appreciate that in various embodiments it may be desirable to allow user limited access to features that are have not been fully installed on the computing device 102. For example, a user of computing device 102 may be notified that features for which he has already paid a fee, or for which he could purchase, will be available soon, or are available for a trial period.

Finally, when the values of the user's subscription level on the remote computing device 110 and the computing device 102 do not match, in step 308, an automatic update of files on the computing device 102 may be initiated. Whether an automatic update 308 is initiated may depend on whether the user installation table on the computing device 102 already contains the product level and feature set for the user's subscription level.

Figure 4:
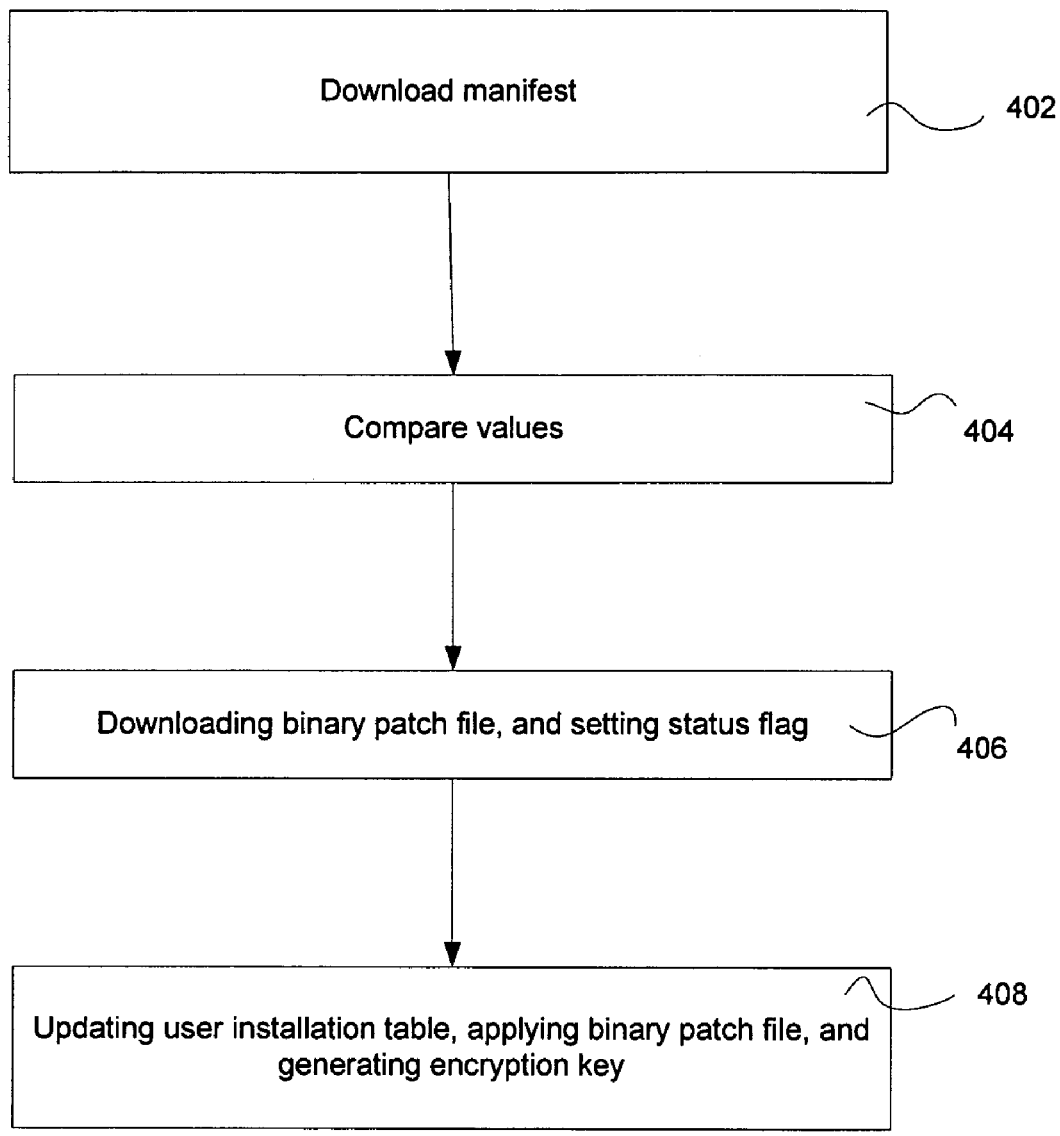
FIG. 4 illustrates a method for updating the application files on computing device 102 in accordance with various embodiments of the invention.
Figure 5:
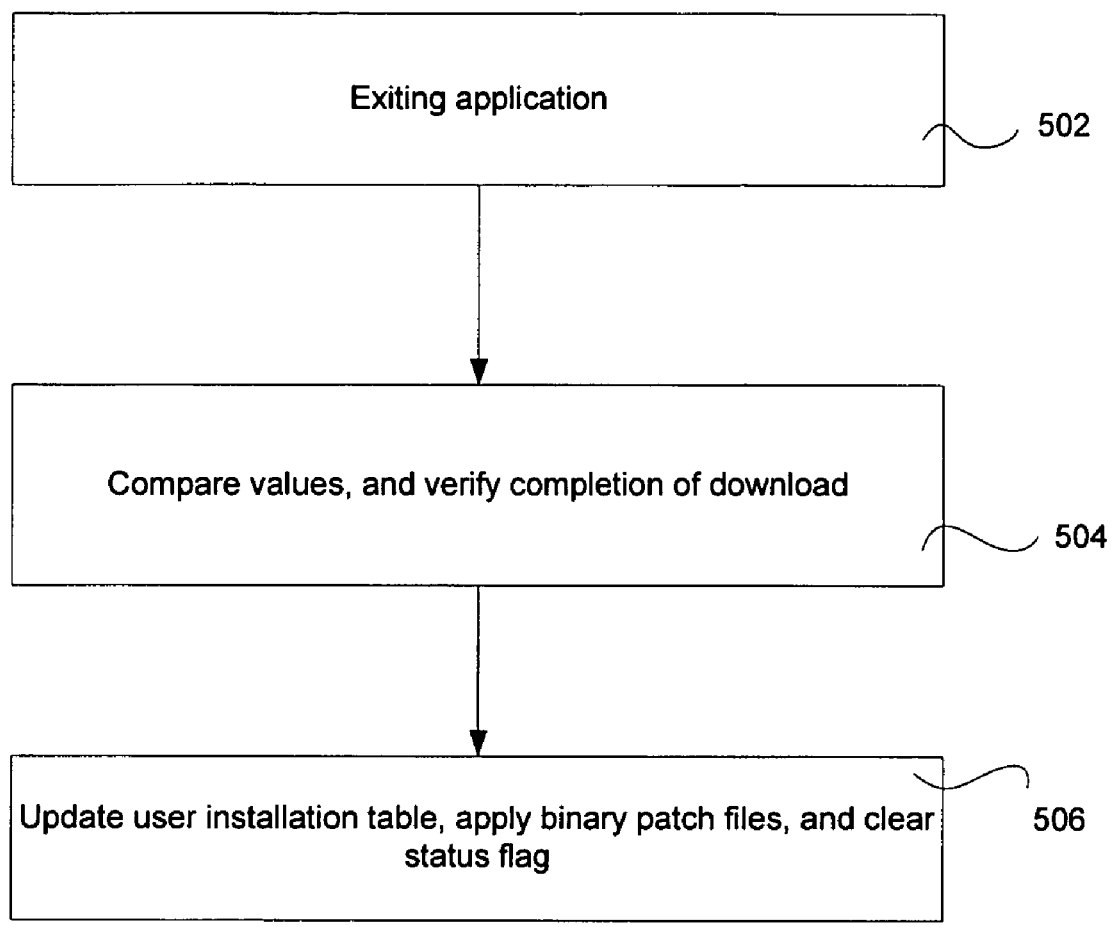
FIG. 5 illustrates the steps for updating the application files on computing device 102 at application shutdown or exit, in accordance with various embodiments of the invention.

For example, in accordance with various embodiments illustrated in FIG. 4, after the user is authenticated in step 302, a manifest may be downloaded 402 from a remote computing device 106. One skilled in the art will appreciate that the manifest may be downloaded from other devices, such as remote computing device 110, so long as that device contains and can distribute the appropriate manifest information. In various embodiments, the manifest may be comprised of one or more filenames, one or more hash values, and one or more cab filenames. One skilled in the art will appreciate that the manifest is not limited to these examples, and may include other information including, but not limited to, one or more path file combinations, or a base from which to create a target file. The manifest may correspond to the user's subscription level. For example, if the user has a subscription level corresponding to the deluxe edition of MICROSOFT® MONEY, then the downloaded manifest might contain the filenames for the product level's feature set. For each file, the manifest may also contain the hash value of the file's contents. One skilled in the art will appreciate that a manifest need not be limited to a hash value. For example, a manifest may include a filename with the relative path, the filesize in bytes, or the filename of a binary patch file, if available. For example, a manifest may be comprised of information that can be used to verify the contents of a file, Next, in step 404, hash value(s) from the manifest may be compared to the hash value(s) of corresponding files on the computing device 102. Those skilled in the art will appreciate that although various embodiments are described using hash values, comparable verification information could also be used in these embodiments. For those files which have a different hash value, the binary difference between the files may be downloaded in step 406 from a remote computing device 106. While the download is being performed, a status flag on the computing device 102 may be set in step 406 to indicate that a download is in progress. Those skilled in the art will appreciate that a download or automatic update can be initiated in various ways. For example, the download can be immediate or can be set to occur in the background using services such as MICROSOFT® Background Intelligent Transfer Service. In another example, the application on the computing device 102 may compile the names of all patch files that need to be downloaded into a queue of names for sequential downloading.

In various embodiments of the invention, the remote computing device 106 might maintain a binary difference between some of the files that could be migrated. The binary difference patch files may contain statically linked libraries that contain a superset of the information between other patch files. Thus, applying the appropriate patch file might cause a user's installation of MICROSOFT® MONEY standard edition to be transformed into MICROSOFT® MONEY deluxe edition. As a result, product libraries on the computing device 102 might be converted into new libraries. At least one advantage of simply downloading a compressed, binary file difference instead of an entire file is that bandwidth may be conserved. If the remote computing device 106 does not contain the appropriate binary difference patch file, the whole file may be provided for download in a compressed form. The name of the whole file may correspond to a cab filename in the manifest information.

After downloading in step 406, the patch files may be applied in step 408 to the product files on the computing device 102. In addition, the user installation table may be updated in step 408 to indicate the product level and feature set currently installed on the computing device 102. In accordance with various embodiments of the invention, the binary patch files may be applied to the computing device 102 when the initiated application is shutdown in step 502. At that time the manifest may be again compared, in step 504, with the files existing on the computing device 102, and the presence of all the downloaded binary patch files may be verified. After verification, the patch files may be applied, in step 506, to the files on the computing device 102. In various embodiments, an encryption key may be generated when a downloaded binary patch file is updating a file containing said key. In various other embodiments, the encryption key need not be regenerated. The status flag may also be cleared in step 506. In various embodiments of the invention, the user may be prompted to authenticate with a remote computing device 110. In the alternative, a user may be allowed to download the binary patch files free-of-charge and without authenticating. At least one advantage to this is that a remote computing device 106 might freely provide patch files and manifest information without the added step of user authentication. The user, however, may be unable to access the functionality in the binary patch files until the user's subscription level has been updated accordingly.

Figure 6:
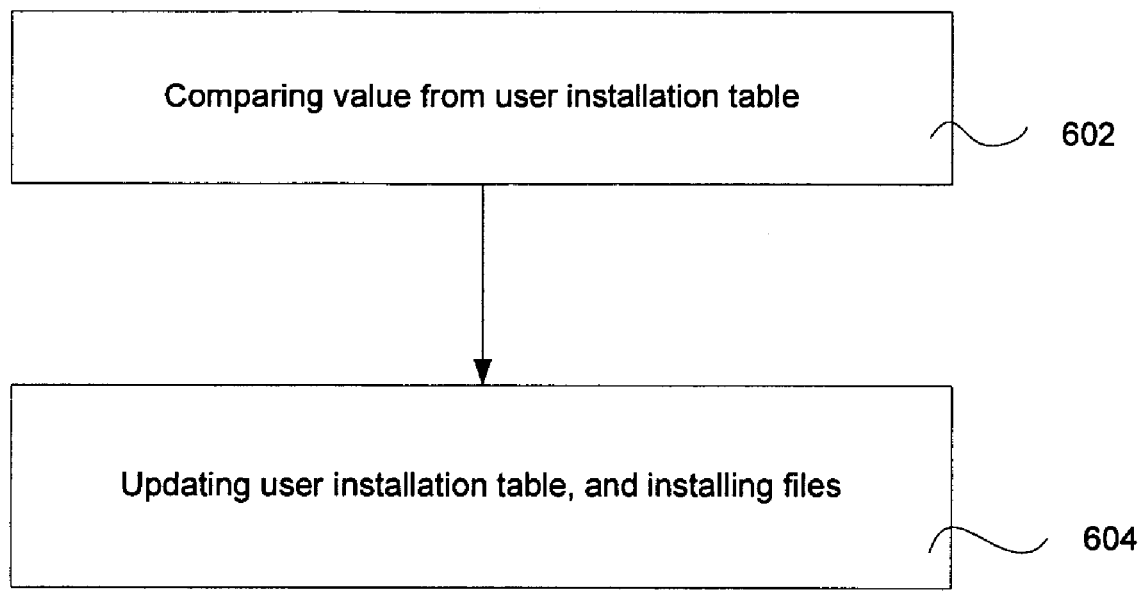
FIG. 6 illustrates the steps for updating the application files on a computing device upon installation of an application in accordance with various embodiments of the invention.

FIG. 6 illustrates the steps for updating the application files on a computing device 102 upon installation of an application in accordance with various embodiments of the invention. At installation time, the application might compare in step 602 the value of the highest product level and/or feature set installed on the computing device 102 for that product with the product level and/or feature set of the file to be installed. In various embodiments of the invention, the value of the highest product level and/or feature set may be stored in the user installation table. In various embodiments, if the computing device 102 already contains a greater product level and feature set, then the installation is aborted. Otherwise, the installation will proceed to update the user installation table and install the files, in step 604, on the computing device 102. Meanwhile, in various embodiments the download and/or installation is performed by an application module 802 and/or patch download module 810. These modules may be able to recognize the a subscription level's feature set and update model to efficiently update and/or download the files (or portions of files) onto the computing device 102. The user installation on the computing device 102 may be updated with an encryption key.

Figure 7:
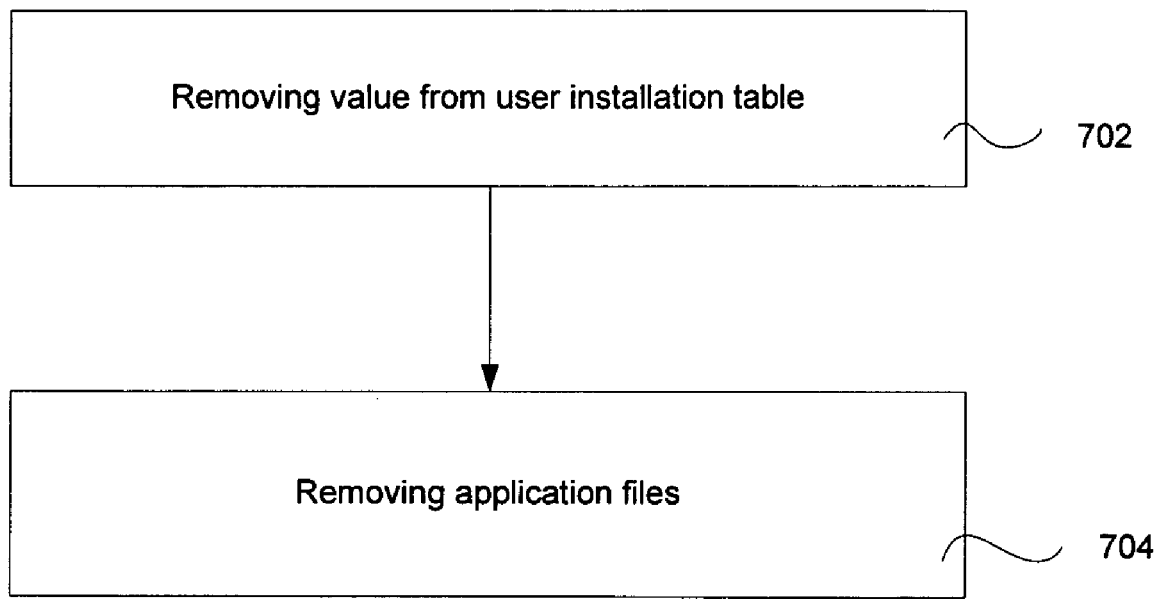
FIG. 7 illustrates the steps for updating the application files on a computing device upon removal of an application in accordance with various embodiments of the invention.

FIG. 7 illustrates the steps for updating the application files on a computing device 102 upon un-installation (or removal) of an application in accordance with various embodiments of the invention. At removal time, the application might remove, in step 702, any entries in the user installation table corresponding to the product level and/or feature set being removed from the computing device 102. In various embodiments, the application files on the computing device 102 may not be updated or removed until the next time the user is authenticated with the remote computing device 110. In various embodiments, if the application being removed is the last of the product installed on the computing device 102, then all application files and settings may be removed immediately in step 704.

Figure 8:
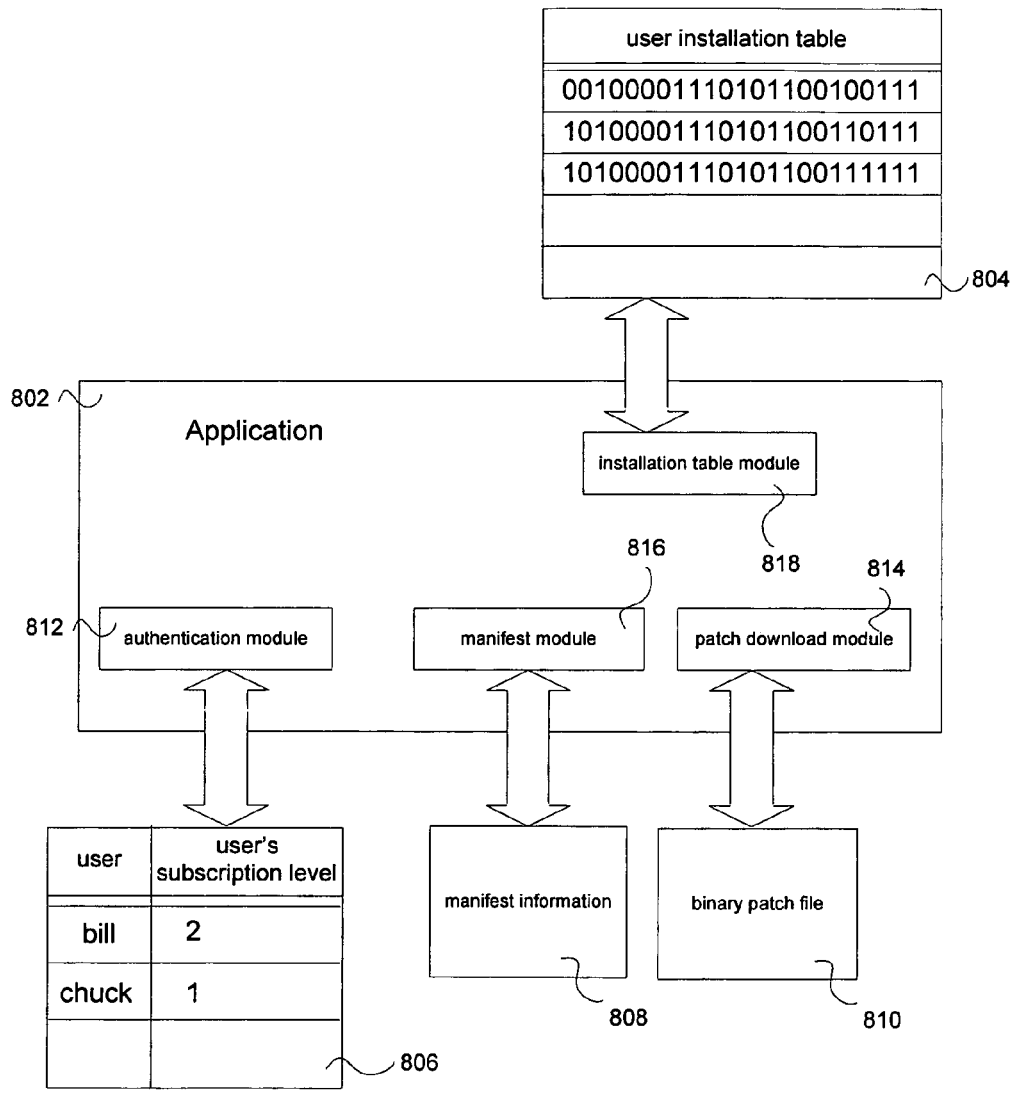
FIG. 8 illustrates a computing device for updating an application feature set, in accordance with various embodiments of the invention.

FIG. 8 illustrates an example of a device for updating an application feature set, in accordance with various aspects of the invention. The figure illustrates only one example of a suitable device and is not intended to suggest any limitations as to the scope of use or operation of the invention. A suitable device might contain a processing unit and memory unit. An application 802 in accordance with various aspects of the invention might be stored in a memory unit and run on a processing unit. For example, a device such as computing device 102 may provide a suitable operating environment for the application 802.

An application 802 configured in accordance with aspects of the invention is comprised of various modules for performing tasking related to updating and rendering an application feature set. For example, the application 802 may read one or more values from the user installation table 804 using the installation table module 818. The installation table module 818 might use these values to determine which application features to render to the user. The installation table module 818 may reside in a memory unit in an encrypted form.

The user installation table 804 may reflect the status of files for an application on a computing device, such as computing device 102. For example, when files relating to the application are updated, the user installation table 804 may be revised to reflect these updates. One skilled in the art will recognize that updating includes, but is not limited to, installing, updating, and removing files. In various examples, the user installation table 804 may not be updated until the user has been authenticated by the authentication module 812. At least one advantage of this is that it prevents a user from installing and/or operating features, versions, or levels of an application for which he does not have an adequate user's subscription level. In an alternative example, the user installation table 804 may be updated without user authentication. Meanwhile, the user is granted access to only those features, versions, and levels of an application for which he has an adequate user's subscription level.

The authentication module 812 may read values from the user's subscription level 806. The user's subscription level may be encrypted. The user may also be prompted for a password prior to being allowed to access the user's subscription level 806. One skilled in the art will appreciate that the user's subscription level may be stored in a memory unit on the device or on a remote computing device, such as remote computing device 110.

Manifest information 808 about files relating to an application may be downloaded from a remote computing device 106 using the manifest module 816. In one example, the manifest module 816 transmits information such as filename and/or user's subscription level and receives manifest information 808. The manifest module 816 processes the manifest information 808 to determine which application files should be updated. These files are updated by the patch download module 814. The patch download module 814 may download the binary patch file 810 stored on a remote computing device 106 and update the application feature set. The binary patch file 810 may be a portion of a file, such as a binary difference patch file, or may be an entire file if no binary patch can be found. In one example, the manifest information 808 and binary patch file 810 may be stored on the same remote computing device 106. In another example, the manifest information 808 and binary patch file 810 may be stored on different computing devices, such as computing device 102 or remote computing device 110.

The present invention has been described in terms of exemplary embodiments thereof. Numerous other embodiments, modifications and variations within the scope and spirit of the appended claims will occur to persons of ordinary skill in the art from a review of this disclosure.

We claim:

1. A computer-implemented method comprising:
   initiating an application on a computing device;
   updating a user subscription level associated with the application by storing on or more values representative of the updated user subscription level in a user installation table that is stored in an encrypted form in a registry;
   reading said one or more values representative of the updated user subscription level, wherein said one or more values indicate one or both of a greatest accessible product level or greatest accessible feature set; and
   rendering at least one feature of a feature set from the application based at least in pan on one or both of said greatest accessible product level or said greatest accessible feature set.

2. The computer-implemented method of claim 1, wherein said one or more values comprise application initialization context information.

3. The computer-implemented method of claim 1, wherein said at least one feature comprises less than all features of said feature set's features.

4. A computing device comprising:
a processing unit programmed with modules comprising:
an authentication module for user authentication and processing a user subscription level;
a manifest module for downloading and processing manifest information;
a patch download module for downloading a binary patch file; and
an installation table module for reading, writing, and updating a user installation table, indicative of an application feature set available on said computing device; and
wherein the user installation table is encrypted in a registry; and
a memory unit comprising:
and
statically linked files related to the application feature set.

5. The device of claim 4, wherein said authentication module transmits user authentication information and receives said user subscription level.

6. The device of claim 4, wherein said memory unit further comprises a status flag for indicating a status of an update.

7. The device of claim 4, wherein said manifest information comprises a filename and a bash value.

8. A computer readable medium having computer-executable instructions which, when executed by a processor, perform a method comprising:
invoking an application on a computing device;
authenticating a user with a remote computing device to obtain at least one value representative of a user subscription level stored on said remote computing device in a user installation table that is stored in an encrypted form in a registry, wherein said user subscription level indicates one or both of an accessible product level associated with said application or an accessible application feature set associated with said application;
updating said user subscription level by storing at least one value representative of an additional user subscription level in the user installation table that is stored in an encrypted form in the registry;
comparing said additional user subscription level with a set of possible application features on said computing device; and based at least in pan on said comparing, rendering one or more application features from said set of possible application features.

9. A computer-implemented method of downloading binary patch files for upgrading an application feature set on a computing device, the method comprising:
downloading a first manifest from a remote computing device corresponding to a user subscription level for an application, wherein said first manifest comprises verification information;
comparing said first manifest verification information with second manifest verification information of a second manifest of a corresponding file, wherein said second manifest resides on said computing device; and
if the first and second manifest verification information do not match:
downloading a corresponding binary file; and
applying said binary file to files installed on said computing device.

10. The computer-implemented method of claim 9, wherein said binary file is a binary patch file and is a portion of a statically linked library file for said application.

11. The computer-implemented method of claim 10, wherein said binary file is a binary patch file and is downloaded without requiring user authentication.

12. The computer-implemented method of claim 9, further including updating a user installation table located on said computing device to reflect the product level and feature set of the files installed on said computing device, and further including generating a new encryption key.

13. The computer-implemented method of claim 9, further including setting a status flag on said computing device to indicate that a download is in progress.

14. A computer readable storage medium having computer-executable instructions which, when executed by a processor, perform a method comprising:
downloading a first manifest corresponding to a user subscription level for an application present on a computing device, wherein said first manifest compromises verification information;
comparing said first manifest verification information with second manifest verification information of a second manifest of a corresponding file residing on said computing device; and if the first and second manifest verification information do not match;
downloading a binary patch file; and
applying said binary patch file to a file installed on said computing device.

* * * * *